(12) United States Patent
Oishi

(10) Patent No.: US 9,463,693 B2
(45) Date of Patent: Oct. 11, 2016

(54) DISPLAY DEVICE

(75) Inventor: Yukio Oishi, Shimada (JP)

(73) Assignee: Yazaki Corporation, Tokyo (JP)

( * ) Notice: Subject to any disclaimer, the term of this patent is extended or adjusted under 35 U.S.C. 154(b) by 124 days.

(21) Appl. No.: 13/509,345

(22) PCT Filed: Sep. 27, 2010

(86) PCT No.: PCT/JP2010/067296
§ 371 (c)(1),
(2), (4) Date: May 11, 2012

(87) PCT Pub. No.: WO2011/062001
PCT Pub. Date: May 26, 2011

(65) Prior Publication Data
US 2012/0223964 A1  Sep. 6, 2012

(30) Foreign Application Priority Data

Nov. 20, 2009  (JP) .................. 2009-264860

(51) Int. Cl.
*G09G 5/00* (2006.01)
*B60K 35/00* (2006.01)
(Continued)

(52) U.S. Cl.
CPC ............... *B60K 35/00* (2013.01); *B60K 37/02* (2013.01); *G01D 11/28* (2013.01);
(Continued)

(58) Field of Classification Search
CPC ............... B60K 2350/408; B60K 2350/965; B60K 37/02; B60K 2350/352; B60K 2350/203; B60K 35/00; B60K 2350/1072; B60K 2350/2013; B60K 2350/1064; B60K 11/28; G01D 11/28; G09G 5/14; G09G 2380/10; G09G 2340/125; G09G 2340/12; G09G 5/026; G12B 11/04; G06T 11/60; B60R 11/0235; B60R 2300/207; B60R 11/04; B60R 31/18; B60R 2300/105; B60R 2300/305; B60R 1/00; B60R 2300/301; B60R 2300/302; B60C 23/0401; G08G 1/167; G08G 1/166; G01P 1/08; H04B 10/116; H04B 10/60; G08C 23/04; H04L 12/2816

See application file for complete search history.

(56) References Cited

U.S. PATENT DOCUMENTS 4,179,938 A * 12/1979 Schramm ................ G01D 7/04
235/103.5 R
4,376,934 A * 3/1983 Prohaska et al. ........ 340/815.76
(Continued)

FOREIGN PATENT DOCUMENTS

CN  1737577 A   2/2006
CN  101371107 A  2/2009
(Continued)

OTHER PUBLICATIONS

Okumura, Meter Unit for Vehicle (2009103540), May 2009.*
(Continued)

*Primary Examiner* — Devona Faulk
*Assistant Examiner* — Charles L Beard
(74) *Attorney, Agent, or Firm* — Locke Lord LLP

(57) ABSTRACT

[Problem] To provide a display device able to visibly and clearly display a relationship between a moving condition of an indicating member and an indexes.
[Means for solving problem] A display device 1 includes: a design pattern 31 on which a plurality of numerical markers 35 are arranged; a pointer 32 configured to move along the numerical markers 35, and display a position corresponding to a measured amount of a moving object; a display member 15 configured to display an afterimage 33 extending in a direction M' opposite to a moving direction M of the pointer 32; and a CPU 10 configured to control the display member 15 to display the afterimage 33. A tip 32a of the pointer 32 is overlapped with an area 36 on which the numerical markers 35 are arranged. The CPU 10 makes the afterimage 33 extend from the tip part 32a of the pointer 32 to be overlapped with the area 36 on which the numerical markers 35 are arranged, and makes the numerical markers 35 visible through the afterimage 33.

7 Claims, 4 Drawing Sheets

(51) Int. Cl.
   *B60K 37/02* (2006.01)
   *G01D 11/28* (2006.01)
(52) U.S. Cl.
   CPC  *B60K 2350/1072* (2013.01); *B60K 2350/203* (2013.01); *B60K 2350/352* (2013.01); *B60K 2350/408* (2013.01); *B60K 2350/965* (2013.01)

(56) References Cited

U.S. PATENT DOCUMENTS

| | | | | |
|---|---|---|---|---|
| 5,374,917 | A * | 12/1994 | Hoffman et al. | 340/438 |
| 5,523,922 | A * | 6/1996 | Kato | G01D 11/28 362/23.19 |
| 5,949,346 | A * | 9/1999 | Suzuki et al. | 340/815.45 |
| 6,906,634 | B1 * | 6/2005 | Kuenzner et al. | 340/815.78 |
| 7,073,125 | B1 * | 7/2006 | Nystrom | B60K 35/00 33/501 |
| 7,262,689 | B2 * | 8/2007 | Kolpasky | B60K 35/00 340/438 |
| 7,369,044 | B2 * | 5/2008 | Ono | B60K 37/02 340/461 |
| 7,441,189 | B2 * | 10/2008 | Michaels | 715/700 |
| 7,675,404 | B2 * | 3/2010 | Kanzaka | B60K 35/00 180/171 |
| 8,160,298 | B2 * | 4/2012 | Okumura | B60K 35/00 382/103 |
| 8,279,141 | B2 * | 10/2012 | Katoh | B60K 37/02 345/55 |
| 8,339,400 | B2 * | 12/2012 | Katoh et al. | 345/440.2 |
| 8,384,619 | B2 * | 2/2013 | Shirakura | B60K 35/00 345/156 |
| 8,443,751 | B2 * | 5/2013 | Pawusch | G01D 7/08 116/28 R |
| 8,509,971 | B1 * | 8/2013 | Isailovski et al. | 701/20 |
| 8,570,308 | B2 * | 10/2013 | Ogasawara | B60K 35/00 340/461 |
| 8,638,206 | B2 * | 1/2014 | Boutin | B60K 35/00 340/425.5 |
| 8,847,743 | B2 * | 9/2014 | Ishikawa | B60K 37/02 340/425.5 |
| 9,162,686 | B2 * | 10/2015 | Ogawa | G01P 1/103 |
| 9,269,169 | B2 * | 2/2016 | Morimoto | B60K 35/00 |
| 9,302,586 | B2 * | 4/2016 | Tran | B60G 17/0165 |
| 2002/0186228 | A1 * | 12/2002 | Kobayashi | B60K 35/00 345/633 |
| 2005/0154502 | A1 * | 7/2005 | Kolpasky | 701/1 |
| 2005/0168330 | A1 * | 8/2005 | Ono | B60K 35/00 340/461 |
| 2005/0212669 | A1 * | 9/2005 | Ono | B60K 37/02 340/461 |
| 2005/0280521 | A1 * | 12/2005 | Mizumaki | B60K 35/00 340/438 |
| 2007/0001830 | A1 * | 1/2007 | Dagci et al. | 340/438 |
| 2007/0069880 | A1 * | 3/2007 | Best | B60K 37/02 340/461 |
| 2007/0078598 | A1 * | 4/2007 | Watanabe | B60K 37/02 701/429 |
| 2007/0146262 | A1 * | 6/2007 | Ogasawara et al. | 345/87 |
| 2007/0285388 | A1 * | 12/2007 | Ogasawara | B60K 35/00 345/157 |
| 2007/0296724 | A1 * | 12/2007 | Katoh et al. | 345/475 |
| 2008/0018597 | A1 * | 1/2008 | Shirakura | B60K 35/00 345/157 |
| 2008/0100841 | A1 * | 5/2008 | Han | G01D 11/28 356/364 |
| 2008/0163811 | A1 * | 7/2008 | Nakamichi | 116/62.4 |
| 2008/0238818 | A1 * | 10/2008 | Katoh | B60K 37/02 345/55 |
| 2008/0238913 | A1 * | 10/2008 | Katoh | B60K 37/02 345/418 |
| 2008/0258892 | A1 * | 10/2008 | Itoh et al. | 340/441 |
| 2008/0258897 | A1 * | 10/2008 | Itoh | B60K 35/00 340/461 |
| 2008/0309475 | A1 * | 12/2008 | Kuno | B60K 35/00 340/462 |
| 2009/0102787 | A1 * | 4/2009 | Okumura et al. | 345/157 |
| 2009/0184812 | A1 * | 7/2009 | Drew et al. | 340/438 |
| 2010/0134267 | A1 * | 6/2010 | Lin | B60K 31/18 340/441 |
| 2010/0283592 | A1 * | 11/2010 | Boutin | B60K 35/00 340/438 |
| 2011/0235943 | A1 * | 9/2011 | Ogasawara | G01D 7/00 382/275 |
| 2012/0223964 | A1 * | 9/2012 | Oishi | B60K 35/00 345/629 |
| 2012/0306635 | A1 * | 12/2012 | Sato | B60K 37/02 340/425.5 |
| 2013/0127608 | A1 * | 5/2013 | Ishikawa | B60K 37/02 340/425.5 |
| 2013/0174773 | A1 * | 7/2013 | Nagara | B60K 37/02 116/201 |
| 2014/0111540 | A1 * | 4/2014 | Morimoto | G06T 11/20 345/619 |
| 2015/0146405 | A1 * | 5/2015 | Jang | G01D 11/28 362/23.07 |
| 2015/0367730 | A1 * | 12/2015 | Wagner | B60K 35/00 701/36 |

FOREIGN PATENT DOCUMENTS

| | | |
|---|---|---|
| CN | 101412374 A | 4/2009 |
| DE | 19500668 A1 | 7/1996 |
| DE | 19807043 A1 | 8/1999 |
| EP | 2365293 A1 | 9/2011 |
| JP | 05-248896 A | 9/1993 |
| JP | 11-020507 A | 1/1999 |
| JP | 2002-257598 A | 9/2002 |
| JP | 2003-262542 A | 9/2003 |
| JP | 2004-045131 A | 2/2004 |
| JP | 2004-325156 A | 11/2004 |
| JP | 2009103540 A * | 5/2009 |
| WO | WO-2008155052 A1 | 12/2008 |

OTHER PUBLICATIONS

Office Action mailed May 14, 2013, issued for the corresponding Japanese patent application No. 2009-264860 and English translation thereof.
Office Action dated Apr. 1, 2014, issued for the corresponding Chinese patent application No. 201080051424.0 and English translation thereof.
The extended European search report dated on May 28, 2014 issued for corresponding European Patent Application No. 10831399.0.
International Search Report dated Nov. 2, 2010, issued for PCT/JP2010/067296.

* cited by examiner

DISPLAY DEVICE

TECHNICAL FIELD

This invention relates to a display device mounted on a moving object such as a vehicle, and configured to display a measured amount of the moving object by a collaboration of a plurality of indexes forming a design pattern and an indicating member for indicating a position corresponding to the measured amount of the moving object, in particular, to a display device configured to display an afterimage of the indicating member.

BACKGROUND ART

A display device is mounted on a moving object such as a vehicle or a ship for displaying data measured by various measuring members to a crew member of the moving object (for example, see Patent Document 1). The display device described in the Patent Document 1 includes; a dial plate on which a plurality of scale marks are arranged; and a pointer moving along the scale marks and indicating a position corresponding to a measured amount of the moving object, and displays the measured amount of the moving object by a collaboration of the scale marks and the pointer.

The display device described in the Patent Document 1 further includes: a display member configured to display an afterimage of the pointer extending in a direction opposite to a moving direction of the pointer; and a display control member configured to control the display member to display the afterimage of the pointer. The display member includes: a plurality of prisms arranged at the center of the dial plate; and a plurality of LEDs each of which is arranged at a rear wall side of the prism. Each prism is formed in a sector shape in a plan view, and the prisms are arranged in the moving direction of the pointer to form a larger sector.

The display control member controls on/off of each LED corresponding to the moving direction of the pointer to illuminate each prism corresponding to the moving direction of the pointer to display an afterimage of the pointer. Thus, by displaying the afterimage of the pointer, the moving direction of the pointer can be displayed on the display device.

PRIOR ART DOCUMENT

Patent Document

Patent Document 1: JP, A, H11-20507

DISCLOSURE OF THE INVENTION

Problem to be Solved by the Invention

However, in the above-described display device, because the prisms are arranged at the center of the dial plate, and a plurality of scale marks are arranged at an outer edge of the dial plate, the afterimage of the pointer and the scale marks are separated from each other. Therefore, the afterimage and the scale marks are arranged in a relatively wide range, thereby visibility is not good. Further, it is hard to clearly recognize a relationship between the moving direction of the pointer and the scale marks.

Accordingly, an object of the present invention is to solve such a problem. Namely, the object of the present invention is to provide a display device able to display visibly and clearly a relationship between a moving condition of an indicating member and indexes.

Means for Solving the Problem

For attaining the object, according to the invention described in claim 1,
there is provided a display device comprising:
a design pattern on which a plurality of indexes are arranged;
an indicating member configured to move along the indexes, and indicate a position corresponding to a measured amount of a moving object to display the measured amount by a collaboration of the indexes and the indicating member;
a display member configured to display an afterimage of the indicating member extending in a direction opposite to a moving direction of the indicating member; and
a display control member configured to control the display member to display the afterimage,
wherein a part of the indicating member is overlapped with an area on which the indexes are arranged,
wherein the display control member makes the afterimage extend from the part of the indicating member to be overlapped with the area on which the indexes are arranged, and makes the indexes visible through the afterimage, and
wherein the pointer, the indexes and the afterimage are overlapped with each other.

According to the invention described in claim 2, there is provided the display device as claimed in claim 1,
wherein the display control member makes the afterimage gradually displayed darker as the afterimage is away from the indicating member.

According to the invention described in claim 3, there is provided the display device as claimed in claim 1 or 2,
further comprising a moving amount calculating member configured to calculate a moving amount of the indicating member per a specific time period,
wherein the display control member makes the afterimage displayed in a size proportional to the moving amount of the indicating member calculated by the moving amount calculating member.

According to the invention described in claim 4, there is provided the display device as claimed in any one of claims 1 to 3,
wherein the display member displays the design pattern, and includes an index identifying member configured to identify the closest index to the indicating member among the indexes, and
wherein the display control member makes the index identified by the index identifying member more emphatically displayed than other indexes.

Effects of the Invention

According to the invention claimed in claim 1, because the afterimage of the indicating member is overlapped with the area on which the indexes are arranged, the afterimage and the indexes are displayed on a narrower range, thereby the visibility is good. Further, the relationship between the moving direction of the indicating member and the indexes are displayed more clearly.

According to the invention claimed in claim 2, because the afterimage is gradually displayed darker as the afterimage is away from the indicating member, the moving direction of the indicating member is more intuitively visible, and clearly displayed.

According to the invention claimed in claim 3, because the afterimage is displayed in a size proportional to the moving amount of the indicating member per a specific time interval, the moving amount of the indicating member per a specific time interval, namely, the measured amount of the moving object per a specific time interval can be displayed by the size of the afterimage.

According to the invention claimed in claim 4, because the closest index to the indicating member is more emphatically displayed than other indexes, the closest index to the indicating member can be clearly displayed. Further, when a plurality of indexes is enlargedly displayed, the index at the moving direction of the indicating member side can be clearly displayed by a combination with the afterimage.

DESCRIPTION OF EMBODIMENTS

Hereinafter, a display device 1 according to an embodiment of the present invention will be explained with reference to FIGS. 1 to 4. The display device 1 according to the embodiment of the present invention is mounted on a moving object such as a vehicle, and displays graphically a condition of the moving object to a crew member of the moving object.

Figure 1:
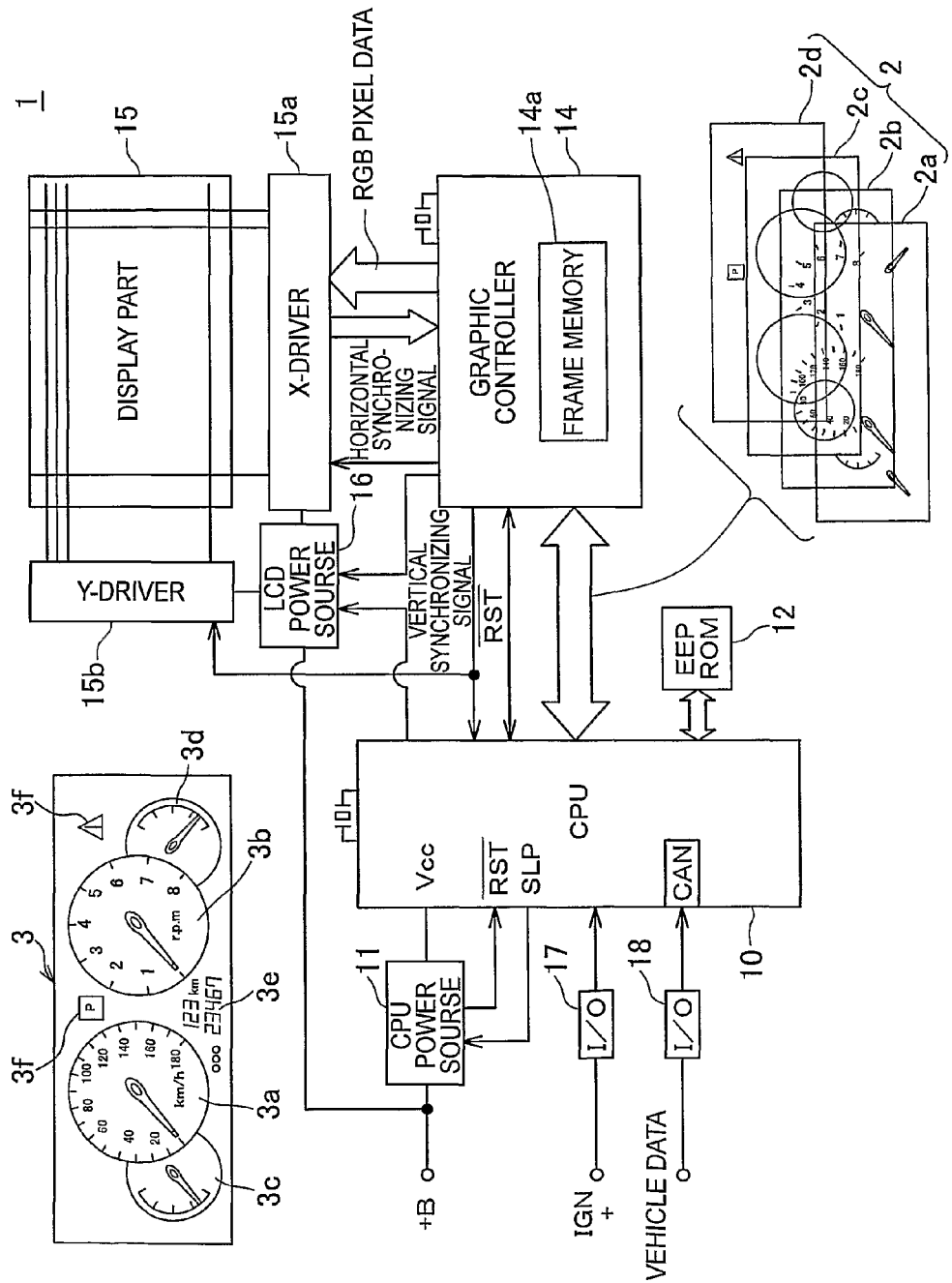
FIG. 1 A system block diagram showing a display device according to an embodiment of the present invention.

As shown in FIG. 1 the display device 1 includes: a CPU 10 (Central

Processing Unit, corresponding to a display control member) for executing various operations and controls according to a predetermined program; a CPU power source 11 for supplying electric power to the CPU; an EEPROM (Electrically Erasable Programmable Read Only Memory) for storing such as a program for the CPU; a RAM (not shown) for storing various data and having an area needed for an operation of the CPU; a graphic controller 14; a display part 15 (corresponding to a display member); an LCD power source for supplying electric power to the display part 15; an ignition I/O circuit 17; and a data I/O circuit 18.

The ignition I/O circuit 17 and the data I/O circuit 18 are connected to the CPU 10 in a manner that various data can be inputted and outputted to each other. Further, the EEPROM 12, the RAM, and the graphic controller 14 are connected to the CPU 10 in a manner that various data can be inputted and outputted to each other.

The CPU 10 executes an arithmetic processing based on a running condition or the like of the moving object, generates multi-layered image data 2 including a pointer image layer 2a, a scare mark image layer 2b, a warning image layer 2d, and the like coincident with a vertical synchronizing signal from the graphic controller 14, and stores them temporarily in the RAM. Then, when the next vertical synchronizing signal is detected, the CPU 10 outputs the multi-layered image data 2 stored in the RAM to the graphic controller 14.

The EEPROM 12 stores a program for controlling the whole operation of the display device 1. By executing the program, the CPU 10 outputs a display command of a desired display screen 3 to the graphic controller 14, and controls the display part 15. Namely, the EEPROM 12 stores various programs such as a program for display control process to make the CPU 10 work as a display control member claimed in claims.

The graphic controller 14 includes a frame memory 14a for taking composite image data combining the multi-layered image data 2 inputted from the CPU 10. The graphic controller 14 arranging the pointer image layer 2a, the scare mark image layer 2b, and a background image layer 2c sequentially at a back side to generate the composite image data of one frame, and stores it in the frame memory 14a.

Further, the display part 15 is connected to the graphic controller 14 in a manner that various data can be inputted and outputted to each other. When receiving the display command from the CPU 10, the graphic controller 14 outputs RGB image data based on the composite image data of the frame memory 14a, the vertical synchronizing signal, and a horizontal synchronizing signal to the display part 15 to display the display screen 3 on the display part 15. Further, the graphic controller 14 simultaneously outputs the vertical synchronizing signal to the CPU 10. Incidentally, instead of the CPU 10, the graphic controller 14 may work as the display control member.

The display member 15 is made of TFT-LCD (Thin Film Transistor—Liquid Crystal Display). The 15 is arranged on a position where a crew member can see, and a visible surface of the display member 15 works as the display screen 3. The display member 15 can display a dot-matrix display pattern and includes an X driver 15a and a Y driver 15b. The display part 15 turns on/off each unit pixel arranged in a matrix to display numbers, figures, or the like on the display screen 3 via the X driver 15a and Y driver 15b. The display part 15 displays the display screen 3 by turning on/off each unit pixel with the X driver 15a and Y driver 15b under the control of the graphic controller 14.

As shown in FIG. 1, the display screen 3 graphically displays a speed meter 3a indicating a vehicle speed, a tachometer 3b indicating the number of rotations of an engine, a fuel gauge 3c indicating residual amount of fuel, a temperature meter 3d indicating temperature of coolant, a digital indicator for travel distance 3e, and a warning indicator 3f.

The speed meter 3a is displayed in a circular shape as a whole. As shown in partially enlarged views of FIGS. 2 and 3, the speed meter 3a includes: a design pattern 31; a pointer 32 (corresponding to the indicating member); and an afterimage 33 of the pointer 32. Namely, the display part 15 displays the design pattern 31, the pointer 32, and the afterimage 33.

The design pattern 31 includes; a plurality of outer-edge marks 34; and a plurality of numerical marks 35 (corresponding to the indexes) arranged at an inside of the outer-edge marks 34. Both the outer-edge marks 34 and the numerical marks 35 are respectively arranged in arc shapes at an inner edge of the speed meter 3a. Incidentally, an area sandwiched between two chain lines in FIGS. 2 and 3 indicates an area 36 on which the numerical marks 35 are arranged.

Figure 2:
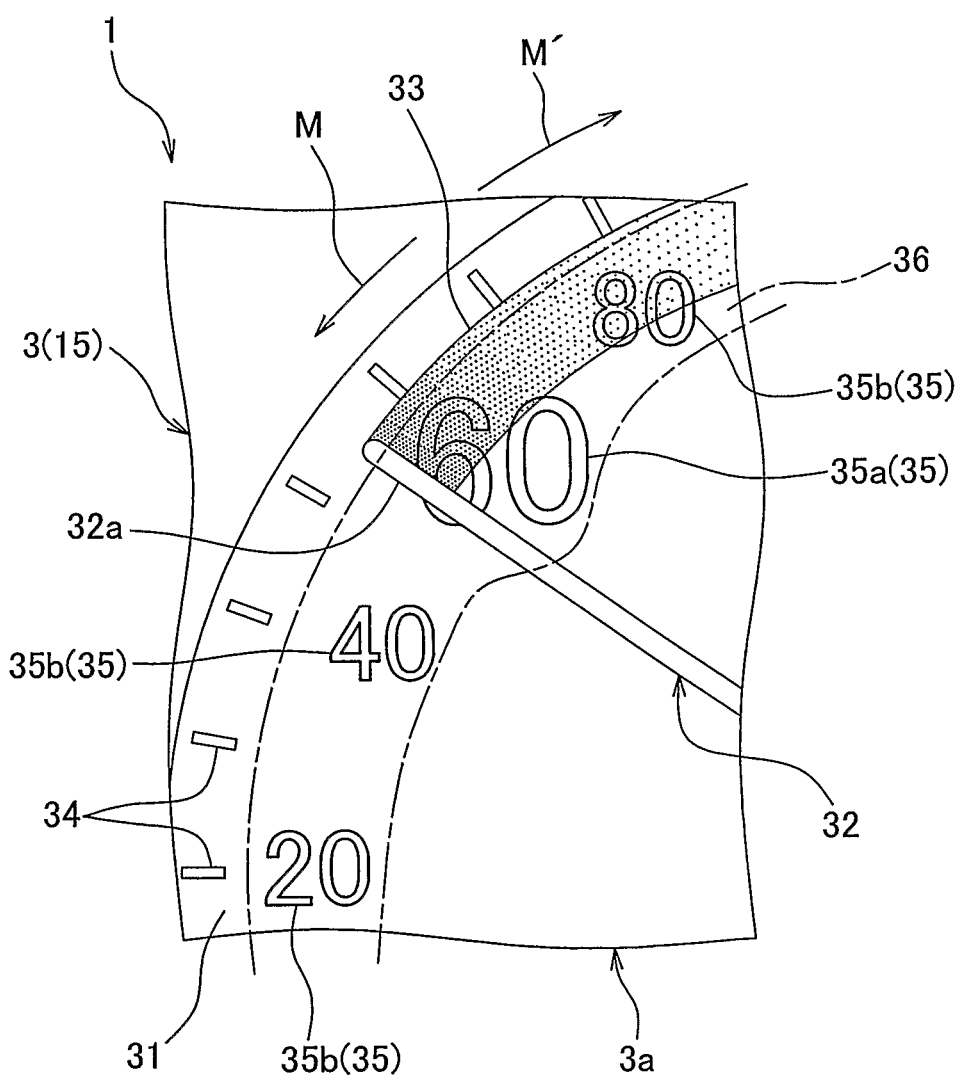
FIG. 2 A front view showing a speed meter displayed on the display device shown in FIG. 1.
Figure 3:
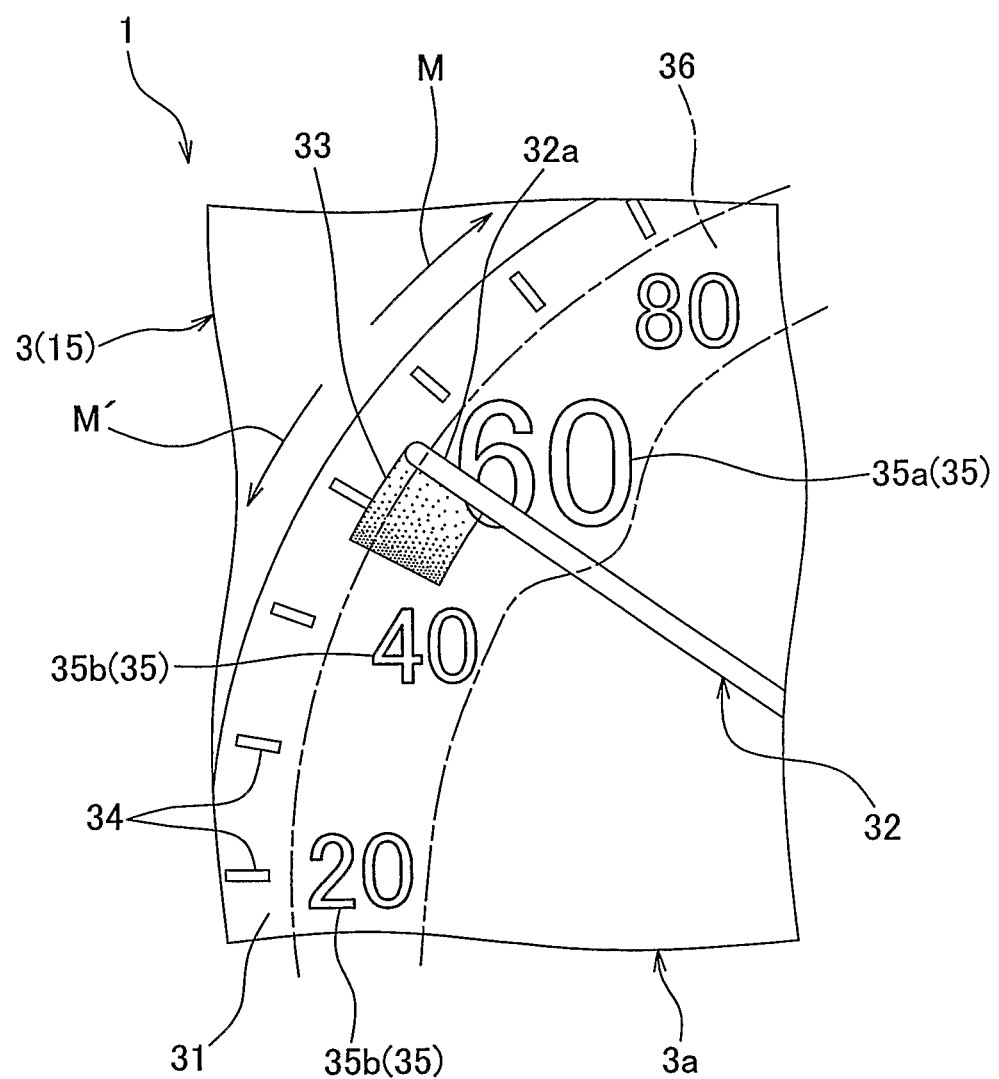
FIG. 3 A front view showing the speed meter in a case that a speed change is smaller than that shown in FIG. 2.

Further, the closest numerical mark 35a to the rotary moving pointer 32 among the numerical marks 35 is more enlargedly displayed than other numerical marks 35b, and more emphatically displayed than other numerical marks 35. In FIGS. 2 and 3, "60" as the closest numerical mark 35a to the pointer 32 is more enlargedly displayed than "20", "40", and "80" as the other numerical marks 35b The pointer 32 is displayed in a bar shape. A one end of the pointer 32 is arranged at the center of the speed meter 3a, and the pointer 32 is rotated around the one end. The other end, namely, a tip 32a (corresponding to a part claimed in claims) of the pointer is overlapped with the area 36 on which the numerical marks 35 are arranged, and moved along the numerical marks 35 to indicate a position corresponding to a measured amount of the moving object.

The afterimage 33 is extended in a direction M' opposite to the moving direction M of the pointer from the tip 32a of the pointer 32, and overlapped with the area 36 on which the numerical marks 35 are arranged. As shown by dot in FIGS. 2 and 3, the afterimage 33 is formed in a translucent shape, and gradually displayed darker as the afterimage 33 is away from the pointer 32. Further, a length of the afterimage 33 is proportional to amount of speed change per a specific time period, namely, to the moving amount per a specific time period of the pointer 32. As the moving amount is large, the afterimage 33 becomes long.

FIG. 2 shows the speed meter 3a in a case that the moving object slows down. The pointer 32 is moved in the moving direction M, and the afterimage 33 is extended in a direction M' opposite to the moving direction M. On the other hand, FIG. 3 shows the speed meter 3a in a case that the moving object speeds up. The pointer 32 is moved in the moving direction M, and the afterimage 33 is extended in a direction M' opposite to the moving direction M, namely, the afterimage 33 is extended in a direction opposite to a direction shown in FIG. 2. Further, amount of speed change in a specific time period in FIG. 2 is larger than that in FIG. 3. Therefore, the afterimage 33 in FIG. 2 is displayed longer than the afterimage 33 in FIG. 3.

In the speed meter 3a, the pointer 32 and the afterimage 33 are formed on the pointer image layer 2a of the multi-layered image data 2. The design pattern 31 is formed on the scare mark image layer 2b disposed at a back side of the pointer image layer 2a. Accordingly, the afterimage 33 is disposed at a front side of the numerical marks 35. However, because the afterimage 33 is translucent, even when the afterimage 33 is overlapped with the numerical marks 35, the numerical marks 35 are visible. Incidentally, a translucent afterimage 33 may be formed on a separately provided translucent layer, or a non-translucent afterimage 33 may be formed on a layer disposed at a back side of the scare mark image layer 2b.

Because the tachometer 3b, the fuel gauge 3c, and the temperature meter 3d have substantially the same configuration as the speed meter 3a. a detailed explanation is omitted. Incidentally, in this embodiment, the afterimage 33 of the pointer 32 and an enlarged display of the numerical marks 35 are displayed on the speed meter 3a. However, of course, those may be displayed on the tachometer 3b or the like.

The ignition I/O circuit 17 is connected to an ignition switch. When the ignition switch is turned on and the engine is started, the ignition I/O circuit 17 outputs a specific signal to the CPU 10. The data I/O circuit 18 is connected to a not-shown speed measuring sensor, a not-shown engine rotation number measuring sensor, a not-shown fuel residual amount measuring sensor, a not-shown coolant temperature measuring sensor, and the like mounted on the moving object. The data I/O circuit 18 outputs signals corresponding to measured amount measured by these measuring sensors to the CPU 10. The CPU 10 receives the inputted signals at a CAN (Controller Area Network), and calculates various measured amount from the signals.

Figure 4:
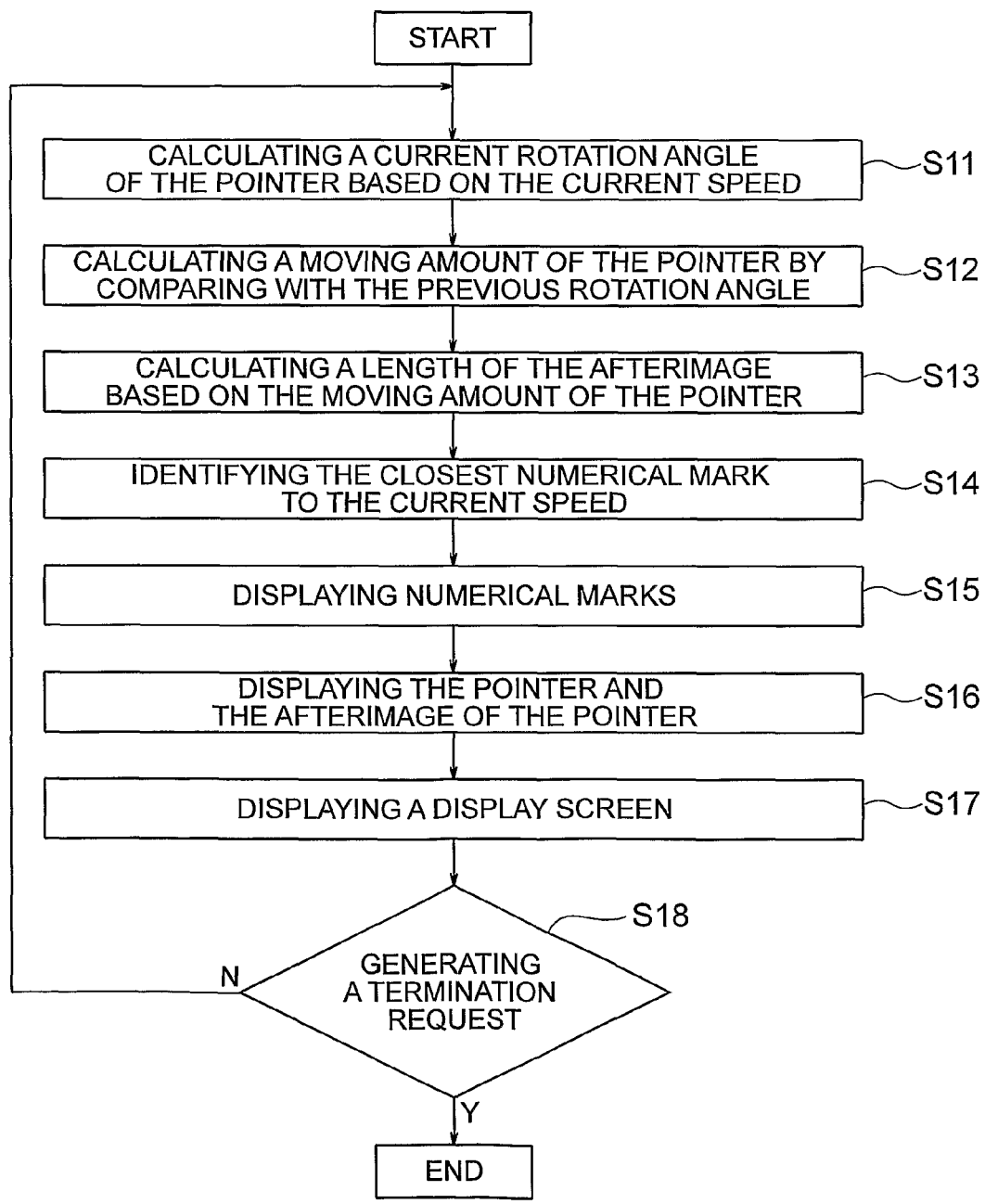
FIG. 4 A flowchart showing a speed control process executed by a CPU shown in FIG. 1.

Next, an example of a display control process executed by the CPU 10 of the display device 1 will be explained with reference to a flowchart shown in FIG. 4. Incidentally, for simplifying the explanation, only a summary of the display control process regarding the speed meter 3a of the display part 15 will be explained.

First, in step S11, a current speed of the moving object is calculated based on a signal of the speed measuring sensor inputted from the data I/O circuit 18, and a current rotation angle data for the pointer 32 indicating a present value is calculated and stored in the RAM. The rotation angle data means, for example, an angle between "0" of the numerical marks 35 and the present value indicated by the pointer 32.

In step S12, a previous rotation angle data stored in the RAM is subtracted from the current rotational data calculated in step S11, and a moving amount (moving angle) data per a specific time interval of the pointer 32 is calculated, and stored in the RAM.

In step S13, length data of the afterimage 33 indicating the length of the afterimage 33 to be displayed is calculated based on the moving amount data of the pointer 32 calculated in the step S12, and stored in the RAM. The length data of the afterimage 33 is determined by using a formula of computation for calculating the length of the afterimage 33 from the moving amount data of the pointer 32, or by using a table on which the moving amount data of the pointer 32 is associated with the length data of the afterimage 33. The length data of the afterimage 33 is proportional to the absolute value of the moving amount data of the pointer 32.

Further, in step S14, one numerical mark 35a which is the closest to the pointer 32 among the numerical marks 35 is identified by comparing the current rotation angle data calculated in the step S11 and the data of the design pattern 31 of the speed meter 3a, and stored in the RAM. Incidentally, when the pointer 32 is in the middle of the numerical marks 35, for example, in the 3a shown in FIG. 2, when the pointer 32 indicates "50", two numerical marks "40", "60" at both sides of the pointer 32 are identified as the numerical marks 35a. Then, in step S15, the numerical marks 35 are displayed on the scare mark image layer 2b, and one or two numerical marks 35a identified in the step S14 is displayed larger than other numerical marks 35 b.

Further, in step S16, the pointer 32 is displayed on the pointer image layer 2a based on the current rotation angle data calculated in the step S11, and the afterimage 33 is displayed based on the current rotation angle data and the length data of the afterimage 33 calculated in the step S13. The afterimage 33 is extended in the direction M' opposite to the moving direction M of the pointer 32 from the tip 32a of the pointer 32, and overlapped with the area 36 on which the numerical marks 35 of the scare mark image layer 2b are arranged. Further, the afterimage 33 is displayed darker as the afterimage 33 is away from the pointer 32.

Incidentally, the extending direction of the afterimage 33 is determined by the polarity (positive or negative) of the moving amount data of the pointer 32. When the moving amount data of the pointer 32 is positive, the afterimage 33 is displayed from the current rotation angle data to a smaller rotation angle. When the moving amount data of the pointer 32 is negative, the afterimage 33 is displayed from the current rotation angle data to a larger rotation angle.

Then, in step S17, the other background image layer 2c and the warning image layer 2d are displayed, and the multi-layered image data 2 is generated in the RAM, and outputted to the graphic controller 14. Then, composite image data is generated from the multi-layered image data 2, and displayed on the display screen 3 of the display part 15.

In step S18, whether a termination request is generated or not is judged. When judged that the termination request is not generated, the process goes back to the step S11, and a bunch of operations are repeated in every specific time interval. When judged that the termination request is generated, the process is ended.

As is clear from the above explanation, the CPU 10 works as the display control member, the moving amount calculating member, and the index identifying member claimed in claims Next, an example of an operation of the display device 1 will be explained with reference to FIGS. 2 and 3. When the display device 1 is started up corresponding to turning on of the ignition switch of the moving object, the display device 1 takes a sample of a signal from the speed measuring sensor in every specific time interval, and displays the speed of the moving object on the speed meter 3a of the display screen 3.

As shown in FIG. 3, when the moving object speeds up and the speed reaches 55 km/h, the afterimage 33 is extended from the tip 32a of the pointer 32 in the direction M' opposite to the moving direction M of the pointer 32, and overlapped with the area 36 on which the numerical marks 35 are arranged. The length of the afterimage 33 is proportional to the moving amount per specific time interval of the pointer 32. Further, the afterimage 33 is displayed gradually darker as the afterimage 33 is away from the pointer 32. Further, because the speed is 55 km/h, "60" as the closest numerical mark 35a to the pointer 32 is more enlargedly displayed than the other numerical marks 35b.

Further, as shown in FIG. 2, when the moving object speeds down and the speed reaches 55 km/h, the afterimage 33 is extended in the direction M' opposite to the moving direction M of the pointer 32, and opposite to the direction shown in FIG. 3. Further, because the amount of speed change per a specific time period, namely, to the moving amount per a specific time period of the pointer 32 of FIG. 2 is larger than that of FIG. 3, the longer afterimage 33 than that of FIG. 3 is displayed. Further, similar to FIG. 3, "60" as the closest numerical mark 35a to the pointer 32 is more enlargedly displayed than the other numerical marks 35b.

According to this embodiment, because the afterimage 33 of the pointer 32 is overlapped with the area 36 on which the numerical marks 35 are arranged, the afterimage 33 and the numerical marks 35 are displayed on a narrower range, and thereby the visibility is good. Further, the relationship between the moving direction M of the pointer 32 and the numerical marks 35 are displayed more clearly. Further, because the afterimage 33 is extended from the tip 32a of the pointer 32, the longer afterimage 33 than the afterimage 33 extended from the center or a base of the pointer 32 can be displayed, and the moving direction M of the pointer 32 can be more clearly displayed.

Further, because the afterimage 33 is gradually displayed darker as the afterimage 33 is away from the pointer 32, the moving direction M of the pointer 32 is more intuitively visible, and clearly displayed.

Further, because the afterimage 33 is displayed in a size proportional to the moving amount of the pointer 32 per a specific time interval, the moving amount of the pointer 32 per a specific time interval, namely, the measured amount of the moving object per a specific time interval can be displayed by the size of the afterimage 33.

Further, because the closest numerical mark 35a to the pointer 32 is more enlargedly displayed than other numerical marks 35b, the closest numerical mark 35a to the pointer 32 can be clearly displayed. Further, when a plurality of numerical marks 35a is enlargedly displayed, the numerical mark 35a at the moving direction M of the pointer 32 side can be clearly displayed by a combination with the afterimage 33.

In this embodiment, the display device 1 graphically displays the condition of the moving body. However, the display device 1 may be a mechanical display device having a pointer rotated by a movement, and a dial plate on which the markers are formed. Further, in this embodiment, the display part 15 of the display device 1 is TFT-LCD. However, the display part 15 may be Organic EL (Electro Luminescence), plasma display, or the like Further, in this embodiment, the tip 32a of the pointer 32 is overlapped with the area 36 on which the numerical marks 35 are arranged. However, other than the tip 32a of the pointer 32 may be overlapped with the area 36. Further, the afterimage 33 is overlapped with the area 36 on which the numerical marks 35 are arranged. However, the afterimage 33 may be overlapped with an area on which outer-edge marks 34 are arranged. Further, in this embodiment, the numerical mark 35a is emphatically displayed by enlarging the numerical mark 35a. However, the numerical mark 35a may be emphatically displayed by the other ways, for example, changing the color of the numerical mark 35a.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

REFERENCE SIGNS LIST 1 display device
10 CPU (display control member, displacement calculating member, index identifying member)
15 display part (display member)
31 design pattern
32 pointer (indicating member)
32a tip (one part)
33 afterimage
35, 35a, 35b numerical marker (index)
36 area
M moving direction of the pointer
M' direction opposite to the moving direction of the pointer

The invention claimed is:
1. A display device for a graphic meter comprising:
  a design pattern on which a plurality of indexes include outer-edge marks and numerical marks arranged within an arc shape:
  an indicating member configured to move along the indexes, and indicate a position corresponding to a measured amount of a moving object to display the measured amount by a collaboration of the indexes and the indicating member;
  a display member configured to display
    the numerical marks visually contained within an upper and lower edge,
    a band-shaped afterimage of the indicating member extending in a direction opposite to a moving direction of the indicating member, wherein the afterimage is visually contained within an upper and lower edge, and the afterimage being displayed within the design pattern such that the afterimage visually extends outside of the upper edge of the numerical marks and the numerical marks visually extend outside of the lower edge of the afterimage; and a display control member configured to control the display member to display the afterimage, wherein a part of the indicating member is overlapped with an area on which the indexes are arranged, wherein the display control member makes the afterimage extend from only a part at a tip end of the indicating member to be overlapped with the area on which the indexes are arranged, and makes the indexes visible through the afterimage, and wherein the indicating member and the afterimage overlap with the indexes, and wherein the display member displays the design pattern, and includes an index identifying member that identifies a closest emphasized index which is the closest to the indicating member among the indexes juxtaposed in an arc of the design pattern, and wherein the display control member displays the closest index emphasized within the arc compared with other indexes on the arc of the design pattern.

2. The display device as claimed in claim 1, wherein the display control member makes the afterimage gradually displayed darker as the afterimage is away from the indicating member.

3. The display device as claimed in claim 1, further comprising a moving amount calculating member configured to calculate a moving amount of the indicating member per a specific time period, wherein the display control member makes the afterimage displayed in a size proportional to the moving amount of the indicating member calculated by the moving amount calculating member.

4. The display device as claimed in claim 2, further comprising a moving amount calculating member configured to calculate a moving amount of the indicating member per a specific time period, wherein the display control member makes the afterimage displayed in a size proportional to the moving amount of the indicating member calculated by the moving amount calculating member.

5. The display device as claimed in claim 2, wherein the display member displays the design pattern, and includes an index identifying member configured to identify the closest index to the indicating member among the indexes, and wherein the display control member makes the index identified by the index identifying member more emphatically displayed than other indexes.

6. The display device as claimed in claim 3, wherein the display member displays the design pattern, and includes an index identifying member configured to identify the closest index to the indicating member among the indexes, and wherein the display control member makes the index identified by the index identifying member more emphatically displayed than other indexes.

7. The display device as claimed in claim 4, wherein the display member displays the design pattern, and includes an index identifying member configured to identify the closest index to the indicating member among the indexes, and wherein the display control member makes the index identified by the index identifying member more emphatically displayed than other indexes.

* * * * *